Jan. 3, 1967 B. M. BAKER 3,296,587
INTRUSION DETECTOR SYSTEM
Filed Feb. 20, 1963 2 Sheets-Sheet 1
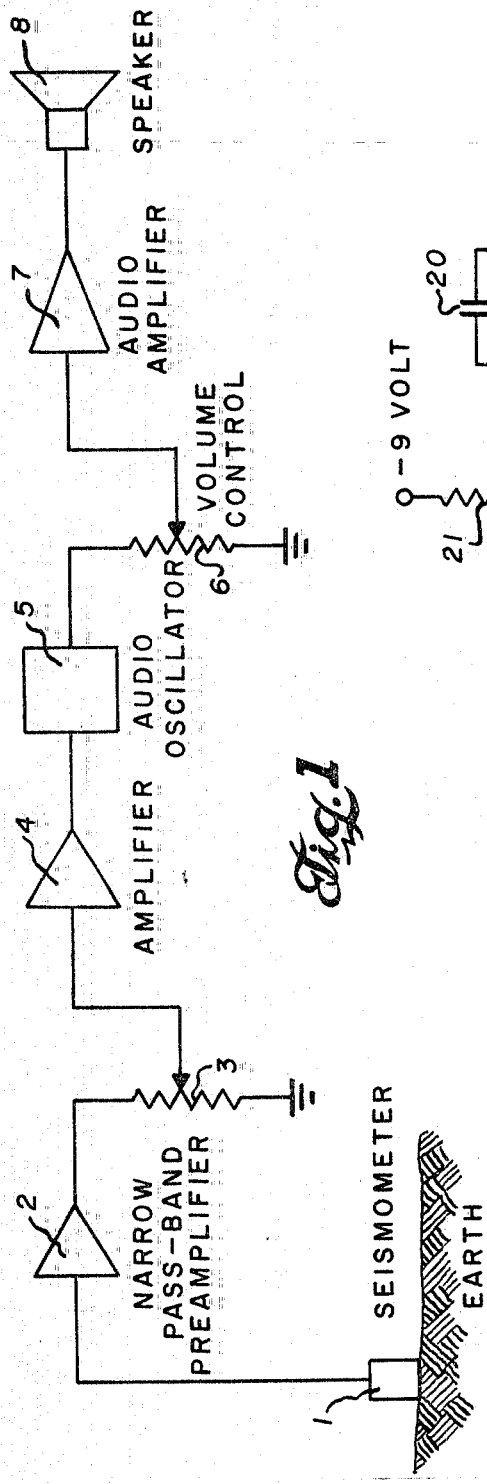
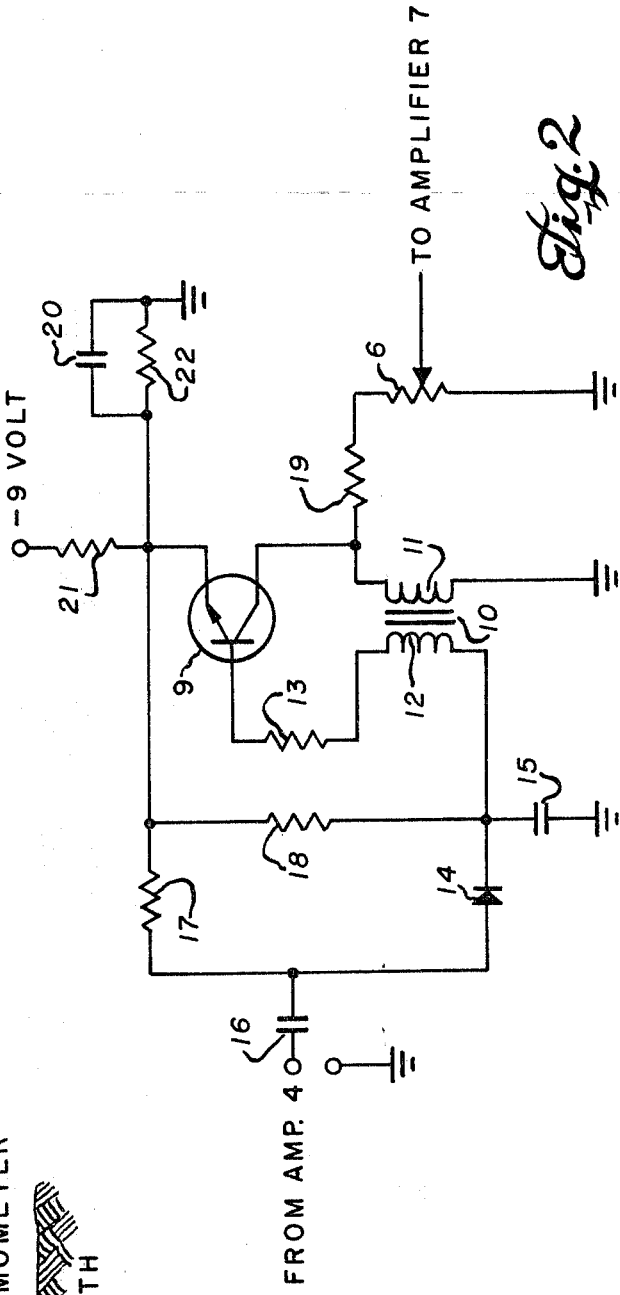
Buford M. Baker
INVENTOR
BY *Melvin Sharp*
ATTORNEY

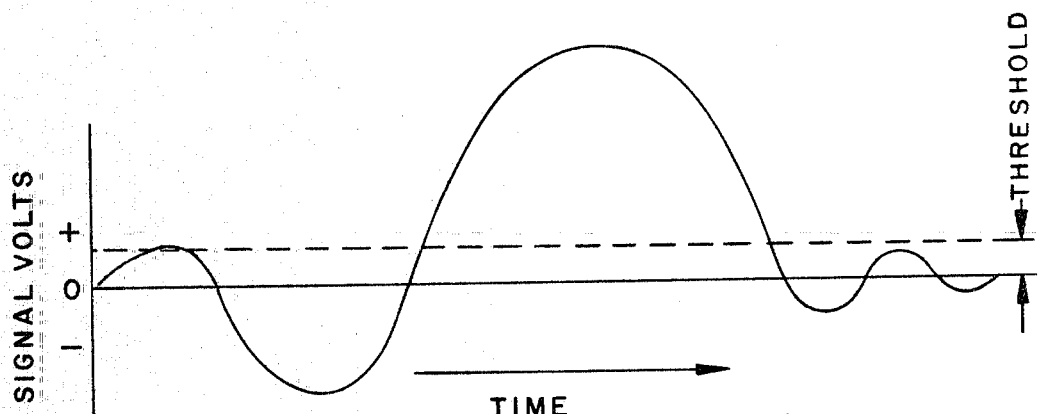
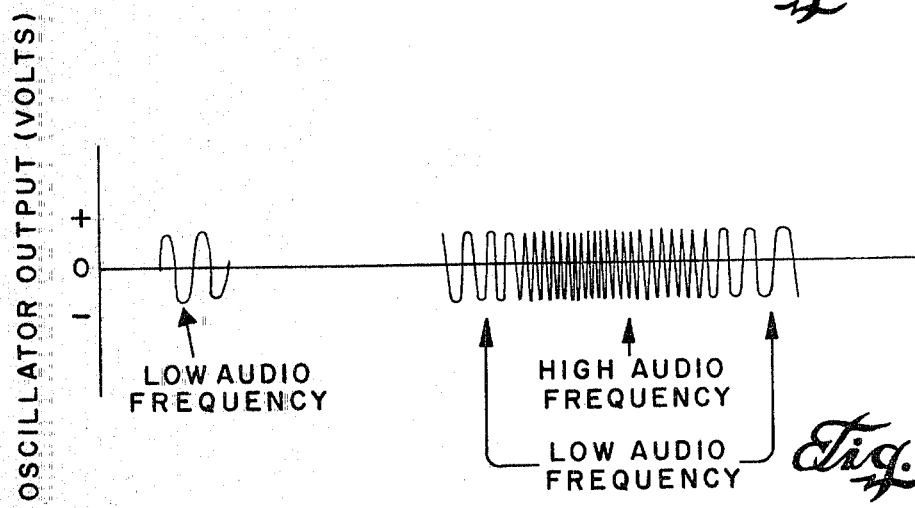
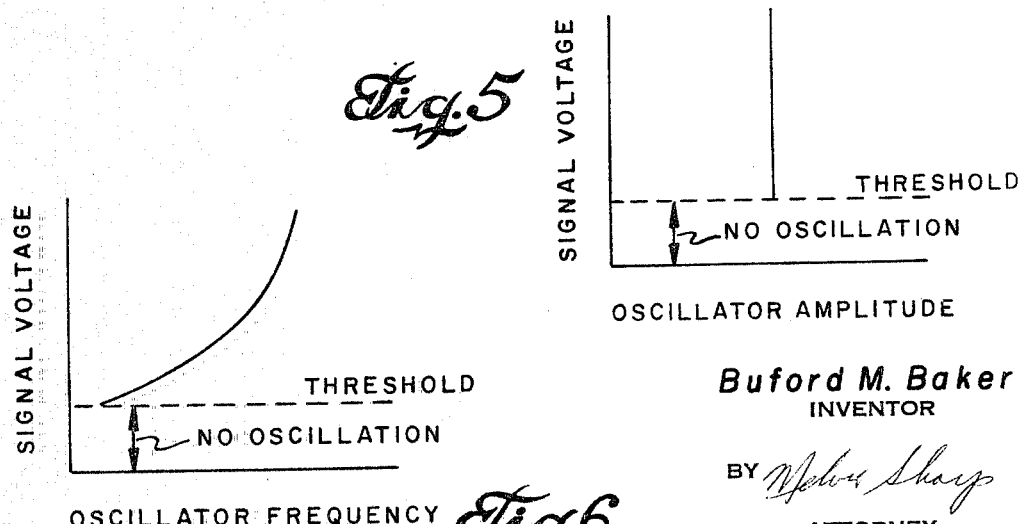
Buford M. Baker
INVENTOR

3,296,587
INTRUSION DETECTOR SYSTEM
Buford M. Baker, Dallas, Tex., assignor to Texas Instruments Incorporated, Dallas, Tex., a corporation of Delaware
Filed Feb. 20, 1963, Ser. No. 259,958
13 Claims. (Cl. 340—15.5)

The invention relates to an apparatus for detecting the movement of objects, including men, animals or equipment moving into a specified area; more particularly, it relates to sensing the intrusion of an object into a specified area and providing a signal indicative of the intruder in order to secure the area.

Accordingly, it is an object of the invention to provide an apparatus capable of securing an area against intrusion.

It is a further object of the invention to provide a novel apparatus for sensing an intrusion into a specified area and producing an audible indication as to the nature of the intrusion.

Broadly, the invention contemplates apparatus utilizing seismic sensing principles for detecting the movement of an object by placing a seismometer at or below the surface of the earth to sense the vibration of the earth caused by the seismic wave generated by the movement of the object. The seismometer output is a low frequency electrical signal whose varying voltage is an electrical analog of the earth vibration. This voltage is used to frequency modulate an audio output thereby to produce an audible signal whose frequency variations are indicative of the nature of the movement sensed by the seismometer. Specifically, the low frequency electrical signal is applied to an audio oscillator for triggering the oscillator "on" when the magnitude of the signal voltage exceeds a predetermined threshold, and for frequency modulating the oscillator audio output dependent upon the magnitude of the signal voltage above the threshold. By triggering and modulating the audible output in this manner, an operator remote from the sensing location may evaluate the audio-output signal in terms of the nature of the intrusion which caused the earth vibration sensed by the seismometer and thereby detect the presence of the intruder.

An intrusion detector according to the invention may thus be used generally to secure an area against intrusion. For example, the seismometer may be placed on roads or pathways to evaluate the movement on the road or pathway; or, it may be placed on the floor of a building such as a warehouse to alert a watchman as to an intrusion.

The foregoing and other objects, features and advantages of the invention will be apparent from the following detailed description taken in connection with the appended claims and attached drawings in which:

FIGURE 1 is a block diagram of the invention;
FIGURE 2 is a circuit diagram of the oscillator illustrated in FIGURE 1;
FIGURES 3 and 4 illustrate an example of the wave forms at the output of the seismometer illustrated in FIGURE 1 and the corresponding output of the oscillator illustrated in FIGURE 1;
FIGURES 5 and 6 illustrate generally the oscillator amplitude and frequency characteristics with respect to its input voltage.

Referring to FIGURE 1, a seismometer 1 is placed upon the earth to sense earth vibrations. The output of the seismometer 1 is applied to pre-amplifier 2 which preferably has a narrow frequency passband, for example centered about the frequency of twenty cycles per second. The sensitivity control 3 is a voltage divider for adjusting the output voltage of amplifier 2 which is then applied to amplifier 4. The output of amplifier 4 is applied to audio oscillator 5 for controlling the output characteristics thereof. The oscillator is normally "off," that is, there is no oscillator output voltage across volume control 6. When the output voltage from amplifier 4 exceeds a predetermined threshold, the oscillator is triggered "on," that is, audio-output oscillations are produced across volume control 6. The output of the volume control is applied to audio amplifier 7 and then to a speaker 8 or headphones, whereat an operator may listen to the output thereof.

FIGURES 5 and 6 illustrate the oscillator 5 output characteristics with respect to the signal voltage output of amplifier 4. With regard to FIGURE 5, it is seen that the oscillator is triggered "on" when the signal voltage exceeds a predetermined threshold and that the oscillator frequency increases with respect to the magnitude of the signal voltage above the predetermined threshold. With regard to FIGURE 6, it can be seen that the amplitude of the oscillator output is substantially constant with respect to the variations of the signal voltage above the predetermined threshold.

FIGURE 2 is a schematic diagram of the audio oscillator 5. The oscillator is a form of blocking oscillator in which the transformer 10 provides the in-phase feedback necessary for oscillation and in which the frequency of oscillation is dependent upon the value of resistor 13 and the value of the positive bias on the base of the NPN transistor 9.

In the absence of a positive bias, above the predetermined threshold, at the base of transistor 9, the transistor 9 is "off," in its non-conductive state, and has insufficient gain to cause oscillation.

However, when the base of transistor 9 has a positive voltage applied thereto above the threshold, oscillation begins and an audio-output signal appears across volume control 6. The positive part of the voltage from the output of amplifier 4 controls the bias at the base of transistor 9 through capacitor 16, diode 14, the coil 12 of transformer 10 and resistor 13. As the positive bias at the base of transistor 9 increases above the predetermined threshold, the signal output frequency increases as illustrated in FIGURE 5.

FIGURE 3 illustrates an example of the output voltage wave form from amplifier 4 related to the threshold of the positive bias at the base of transistor 9 necessary to produce oscillation. When the signal voltage is above the threshold, oscillation is produced. FIGURE 4 illustrates the signal output frequency across volume control 6 corresponding to the signal voltage illustrated in FIGURE 3. It can be seen that when the signal voltage is below the threshold there are no oscillations but when the signal voltage exceeds the threshold, oscillation begins and the frequency of oscillation is dependent upon the magnitude of the signal above the threshold.

The signal output frequency is "stretched out" slightly in time with respect to the signal voltage above the threshold. This function is produced by the capacitor 15 which holds the positive bias at the base of transistor 9 slightly longer than the duration of the corresponding positive voltage from amplifier 4. The resistor 18 and capacitor 15 establish the time constant for holding the positive bias at the base of transistor 9.

One example of the specific components that may be used as the seismometer 1 and audio oscillator 5 in the apparatus illustrated in FIGURE 1 are given below.

Seismometer 1—Texas Instruments Incorporated "S–43 Miniature Land Seismometer"
Capacitors:
    15 _____ 10 mfd.
    16 _____ 250 mfd.
    20 _____ 10 mfd.
Resistors:
    13 _____ 68K
    17 _____ 10K

| | |
|---|---|
| 18 | 6.8K |
| 19 | 22K |
| 21 | 4.7K |
| 22 | 10K |
| 6 | 10K |

Diode:
| | |
|---|---|
| 14 | 1N2069 |

Transistor:
| | |
|---|---|
| 9 | 2N338 |

The sensitivity control 3, FIGURE 1, permits the operator to select an over-all sensitivity suitable for the particular installation of the apparatus. Normally, the sensitivity control could be set so there are occasional background "noise" signals to be heard from the speaker 8. With this type of setting, an intruder cutting the wires of the apparatus could be detected by the absence of the background "noise."

Although, the invention has been described in conjunction with the use of a single seismometer adjacent the surface of the earth to sense the movement of an object, this should not be taken in a limiting sense, since the seismometer, as previously stated, could be placed on the floor of a warehouse or that of an office building, in which event the seismometer would sense the vibration in the floor produced by an intruder.

Moreover, while the invention has been described in conjunction with the use of a single seismometer to sense the movement of an object, this also should not be taken in a limiting sense, since two or more seismometers may be used to sense the movement of the object and thereby increase the area to be secured. If two or more seismometers are used, their outputs may be combined at a summing point and then applied to the pre-amplifier 2. In this case, the operator would not be able to determine which seismometer sensed the intrusion. Therefore, after the operator has determined that an intrusion has occurred, he could switch out the seismometers progressively until the intrusion was localized. Also, the use of two or more seismometers spaced around the periphery of an area for example, permits an operator to be located remote from all the sensing locations, to evaluate the audio-output signal, and then to localize the intrusion.

In summary, the apparatus according to the invention provides an audible signal whose frequency and "off"-"on" characteristic correspond to the intelligence contained in the seismometer output signal. Thereby an operator is presented with an audible signal which can be comprehended in relation to the intruder.

It is to be understood that the above described embodiments are merely illustrative of the invention. Numerous other arrangements may be devised by those skilled in the art without departing from the spirit and scope of the invention as defined by the appended claims.

What is claimed is:

1. An apparatus for detecting the movement of an object which produces vibration in a medium, comprising means for sensing the vibration and producing a signal whose magnitude is representative of the vibration, and means responsive to said signal for producing an audio-frequency output having a frequency which varies with the magnitude of said signal.

2. The apparatus of claim 1, wherein the signal is a low frequency electrical signal.

3. The apparatus of claim 2, wherein the audio-frequency output is an acoustic output.

4. The apparatus of claim 3, wherein the means responsive to said signal includes an audio oscillator responsive to a predetermined threshold magnitude of the electrical signal.

5. The apparatus of claim 4, wherein the means responsive to said signal includes a speaker connected to the output of the audio oscillator for providing the acoustic output.

6. The apparatus of claim 5, including a narrow frequency band pass means for applying the electrical signal to the input of the audio oscillator.

7. The apparatus of claim 6, including means for adjusting the magnitude of the electrical signal.

8. The apparatus of claim 7, including means for adjusting the amplitude of the audio-frequency output of the audio oscillator.

9. An apparatus for detecting the movement of an object producing vibration in a medium, comprising a seismometer adjacent the surface of the medium for sensing the vibration and for producing an electrical signal in response thereto whose magnitude is representative of the vibration, an audio oscillator, a narrow frequency band pass means for applying the signal from said seismometer to said audio oscillator, means in said audio oscillator responsive to a predetermined threshold voltage of the signal for triggering said audio oscillator to an "on" state and further responsive to the magnitude of said voltage above the predetermined threshold for varying the frequency of the audio oscillator output, and means responsive to the output of the audio oscillator for producing an acoustic signal indicative of the object.

10. The apparatus of claim 9, wherein the medium is the earth.

11. The apparatus of claim 10, wherein the seismometer adjacent the surface of the earth is located below the surface of the earth.

12. The apparatus of claim 11, including means for adjusting the magnitude of the electrical signal applied to the input of the audio oscillator.

13. The apparatus of claim 12, including means for adjusting the amplitude of the output of the audio oscillator.

References Cited by the Examiner

UNITED STATES PATENTS

| | | | |
|---|---|---|---|
| 2,942,247 | 6/1960 | Lineau et al. | 340—261 |
| 3,049,699 | 8/1962 | Larrick et al. | 340—258 |
| 3,109,165 | 10/1963 | Bagno | 340—15 |
| 3,132,330 | 5/1964 | Donner | 340—15 |
| 3,147,467 | 9/1964 | Laakmann | 340—261 |
| 3,168,729 | 2/1965 | Volberg | 340—384 |
| 3,192,516 | 6/1965 | Simpkins et al. | 340—261 |

FOREIGN PATENTS

| | | |
|---|---|---|
| 1,269,273 | 7/1961 | France. |
| 1,297,213 | 5/1962 | France. |

SAMUEL FEINBERG, *Primary Examiner.*

BENJAMIN A. BORCHELT, *Examiner.*

R. M. SKOLNIK, *Assistant Examiner.*